United States Patent [19]

Sakane

[11] Patent Number: 4,606,240

[45] Date of Patent: Aug. 19, 1986

[54] STEERING WHEEL

[75] Inventor: Katsunobu Sakane, Ichinomiya, Japan

[73] Assignee: Toyoda Gosei Co., Ltd., Nishikasugai, Japan

[21] Appl. No.: 743,491

[22] Filed: Jun. 11, 1985

[30] Foreign Application Priority Data

| Jun. 11, 1984 | [JP] | Japan | 59-120614 |
| Sep. 28, 1984 | [JP] | Japan | 59-204533 |
| Sep. 28, 1984 | [JP] | Japan | 59-148025[U] |
| Oct. 2, 1984 | [JP] | Japan | 59-206567 |

[51] Int. Cl.⁴ .................................. B62D 1/04
[52] U.S. Cl. ....................... 74/552; 280/750
[58] Field of Search ................. 74/552; 280/750

[56] References Cited

U.S. PATENT DOCUMENTS

| 2,913,924 | 11/1959 | Pratt | 280/750 X |
| 3,675,505 | 7/1972 | Henning | 74/552 |
| 3,930,420 | 1/1976 | Kizu | 74/552 |

FOREIGN PATENT DOCUMENTS

| 2410590 | 8/1979 | France | 74/552 |
| 127253 | 10/1980 | Japan | 74/552 |
| 26673 | 2/1983 | Japan | 74/552 |

*Primary Examiner*—Harold W. Weakley
*Attorney, Agent, or Firm*—Cushman, Darby & Cushman

[57] ABSTRACT

A steering wheel for an automobile including a brittle plastic impact energy absorber disposed on a boss assembly. The absorber is held in a wheel pad by brackets having a front connector and a rear connector. The front connector is engaged with the front edge of a boss plate, and the rear connector with a wall portion of the main body of the steering wheel or with a support provided in the boss assembly. This engagement is easy to achieve reliably only if the wheel pad is forced down into the boss assembly.

5 Claims, 18 Drawing Figures

STEERING WHEEL

BACKGROUND OF THE INVENTION

1. Field of the Invention

This invention relates to an automotive steering wheel including a brittle plastic impact energy absorber disposed on a boss and, more particularly, to a steering wheel which, when fabricated, facilitates the connection of an impact energy absorber and a wheel pad to a boss.

2. Description of the Related Technology

There is known a steering wheel having a brittle plastic impact energy absorber disposed in a boss assembly. The absorber is disposed in a box-shaped wheel pad provided on a boss plate and connected to the boss assembly by screws.

A steering wheel for an automobile is usually assembled in a line in which the automobile is assembled. The main body of the steering wheel including the boss assembly, but excluding the wheel pad is first connected to a steering shaft, and after the connection of lead wires for a horn switch, etc. has been done, the wheel pad carrying the impact energy absorber therein is placed on the boss assembly and secured thereto by the screws passed through the rear side of the boss assembly.

The main body of the steering wheel is secured in position above the driver's seat in the automobile before the wheel pad is joined thereto. The positioning and tightening of the screws on the rear side of the main body are a considerably difficult and inefficient job which requires the worker to take an unnatural posture.

SUMMARY OF THE INVENTION

It is an object of this invention to provide a steering wheel including a wheel pad carrying an impact energy absorber which is easy to connect securely with a boss assembly only if it is forced down into the boss assembly.

It is another object of this invention to provide a steering wheel including an impact energy absorber which is easy to secure in a wheel pad.

The impact energy absorber is secured in the wheel pad by an upper bracket and a lower bracket. The lower bracket has a front connector engaged with the front edge of a boss plate, and a rear connector engaged with a support secured to the boss assembly, or with the main body of the steering wheel. These features make it sufficient to force the wheel pad into the boss assembly.

Mutually engageable pawls and holes are provided at the joints between the upper and lower brackets for securing them together provisionally when the brackets holding the absorber is joined to the wheel pad. These features facilitate the securing of the brackets to the wheel pad.

DESCRIPTION OF THE PREFERRED EMBODIMENTS

Figures 1, 5:
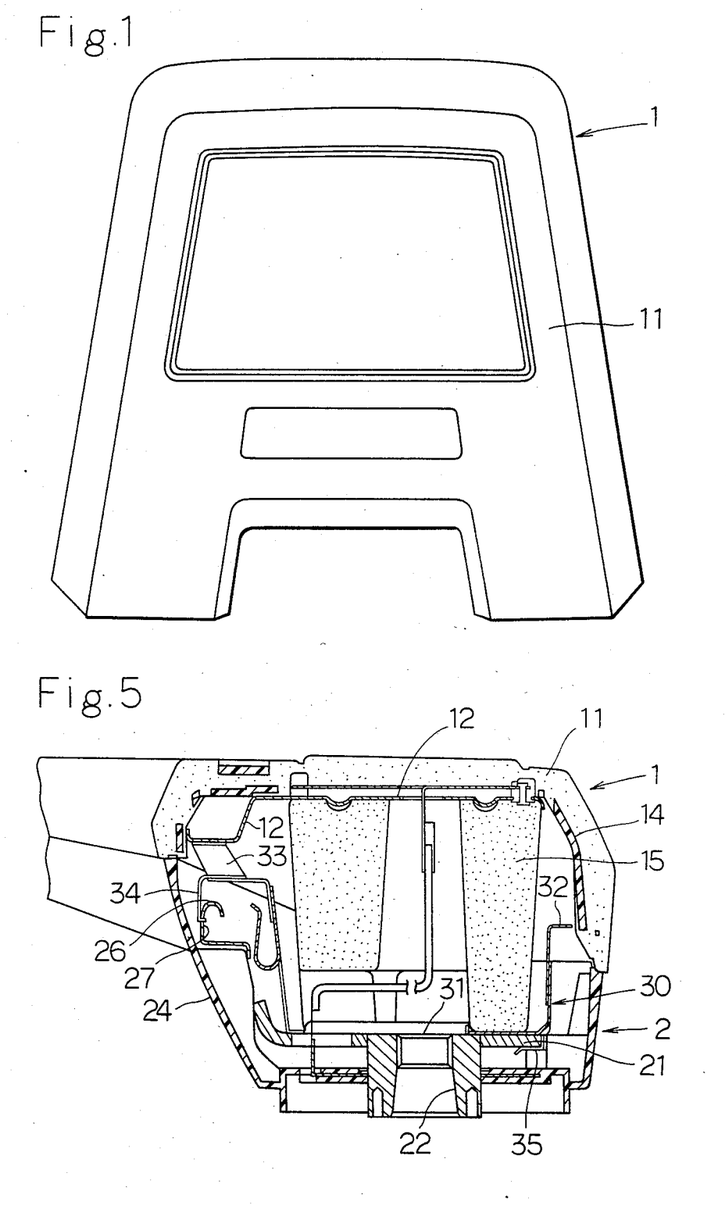
FIG. 1 is a top plan view of a wheel pad according to a first embodiment of this invention.
FIG. 5 is a sectional view of the wheel pad and the boss assembly as put together.
Figure 2:
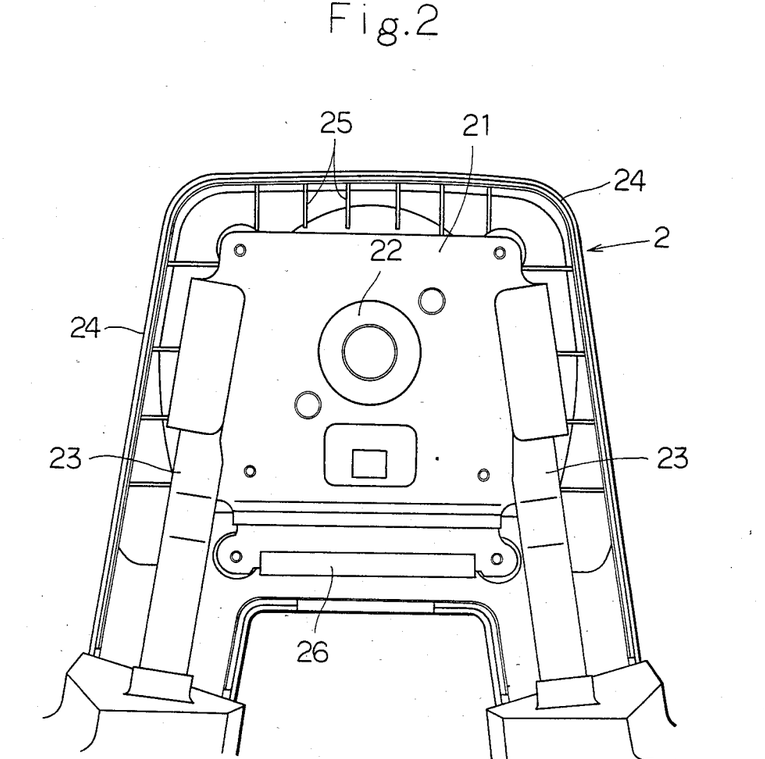
FIG. 2 is a top plan view of a boss assembly according to the first embodiment of this invention.
Figure 3:
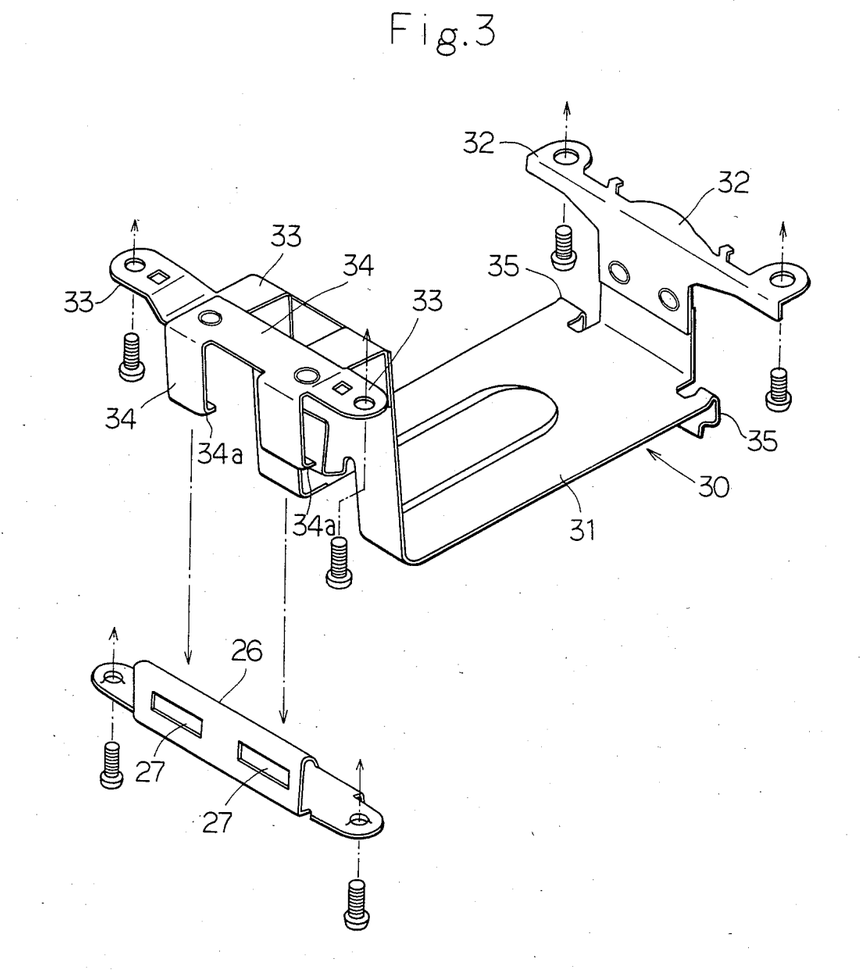
FIG. 3 is a perspective view of a lower bracket according to the first embodiment of this invention.
Figure 4:
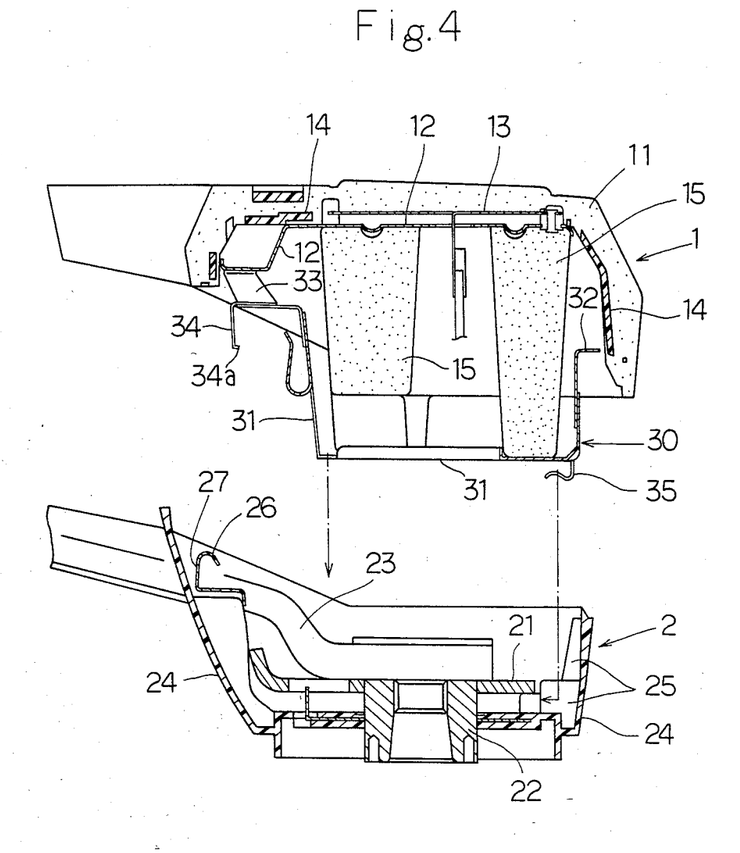
FIG. 4 is an exploded sectional view of the wheel pad and the boss assembly.
Figure 6:
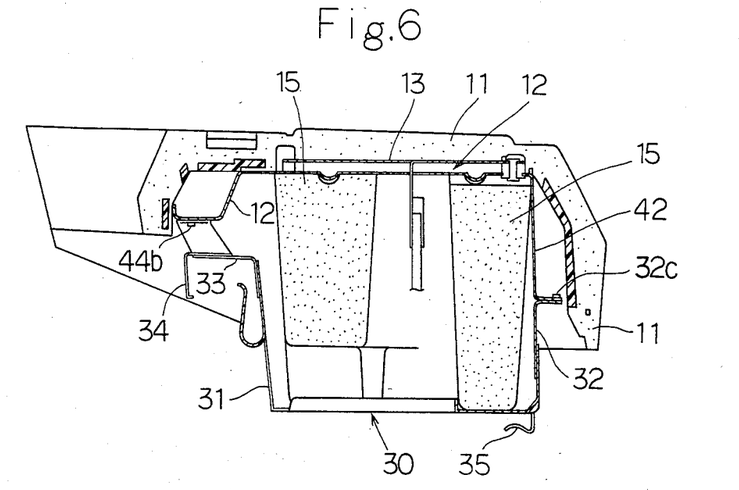
FIG. 6 is a sectional view of the wheel pad.

Referring first to FIGS. 1 to 8, a steering wheel for an automobile according to a first embodiment of this invention comprises a wheel pad 1, of which FIG. 1 is a top plan view, and a boss assembly 2, of which FIG. 2 is a top plan view. FIG. 4 is a vertical sectional view of the wheel pad 1 and the boss assembly 2 separated from each other. The wheel pad 1 is provided at its top with a soft synthetic resin cover 11. An upper bracket 12 of the sheet metal construction is located inwardly of the cover 11 for holding the top of an impact energy absorber as will hereinafter be described in detail. A horn switch plate 13 is disposed above the bracket 12. A plurality of hard plastic inserts 14 are provided in the cover 11 to maintain it in proper shape. Nuts not shown are appropriately embedded in the inserts 14 and cooperate with screws to secure the bracket 12 to the cover 11. The impact energy absorber is shown at 15 and comprises brittle plastic, such as hard polyurethane foam. It is disposed between the upper bracket 12 and a lower bracket 30 and held in the wheel pad 1.

The lower bracket 30 is shown in detail in FIG. 3 and comprises a main body 31 which is bent upwardly at both of its front and rear ends. A front mounting fixture 32 is secured to the front end of the main body 31 and has a screw hole at each end thereof. A rear mounting fixture 33 is secured to the rear end of the main body 31 and has a screw hole at each end thereof. A rear connector 34 is secured to the rear mounting fixture 33 and has a pair of downwardly directed connecting legs. The main body 31 also has a front connector 35 defined by a pair of downwardly directed connecting legs located on the opposite sides of the upwardly bent front end. The main body 31 and the rear connector 34 are each formed from a sheet of spring steel, while the front and rear mounting fixtures 32 and 33 are of the ordinary steel sheet construction. Each leg of the rear connector 34 has a lower end 34a which is inwardly bent to a small extent for the purpose to be hereinafter described. Each leg of the front connector 35 is inwardly bent to a considerable extent, and engageable with a boss plate as will hereinafter be described. The lower bracket 30 is not limited to the construction shown in FIG. 3, but may be modified to suit the shape of the absorber 15 and the upper bracket 12. The lower bracket 30 holding the absorber 15 therein is joined to the upper bracket 12 by four screws extending through the screw holes in the front and rear mounting fixtures 32 and 33.

The boss assembly 2 comprises a boss plate 21, a boss 22 in the center thereof, a pair of spoke cores 23 secured to the opposite side edges of the boss plate 21, and a synthetic resin lower cover 24 screwed to the bottom of the boss plate 21, as shown in FIGS. 2 and 4. A plurality of upstanding ribs 25 facing the front edge of the boss plate 21 are provided on the inner surface of the lower cover 24 at the front end thereof for reinforcing it, and for guiding the front connector 35 in position when the wheel pad 1 is fitted in the boss assembly 2. A support 26 is centrally disposed inwardly of the rear end of the lower cover 24 at a level of height above the boss plate 21 and secured to the lower cover 24 by screws. The support 26 comprises a strip having a portion which is upstanding from one of its longitudinal edges, and which is formed with a pair of slots 27, as shown in FIG. 3.

The boss assembly 2 is joined to the top of a steering shaft in an automobile, and the wheel pad 1 is fitted over the boss assembly 2. More specifically, the wheel pad 1 is positioned above the boss assembly 2, as shown in FIG. 4, and lowered into the boss assembly 2 so that the front connector 35 on the lower bracket 30 may be guided down the ribs 25 in the lower cover 24 of the boss assembly 2. Then, the wheel pad 1 is slid backward, or to the left in FIG. 4, whereupon the front connector 35 is properly engaged with the front edge of the boss plate 21 to hold it resiliently. The rear end of the wheel pad 1 is forced down into the boss assembly 2, whereupon the rear connector 34 on the lower bracket 30 is slid along the rear face of the upstanding portion of the support 26 and its inwardly bent lower ends 34a are brought into resilient engagement with the slots 27, respectively. Thus, the wheel pad 1 is easily and firmly connected to the boss assembly 2 by the four connecting legs of the front and rear connectors 35 and 34, as shown in FIG. 5.

The wheel pad can be joined to the boss assembly easily and quickly only if it is forced down into the boss assembly. The worker is no longer required to take any unnatural posture for positioning and tightening the screws on the rear side of the boss assembly secured to the steering shaft. This improves the efficiency of steering wheel assembly and thereby automobile manufacture.

Figure 7:
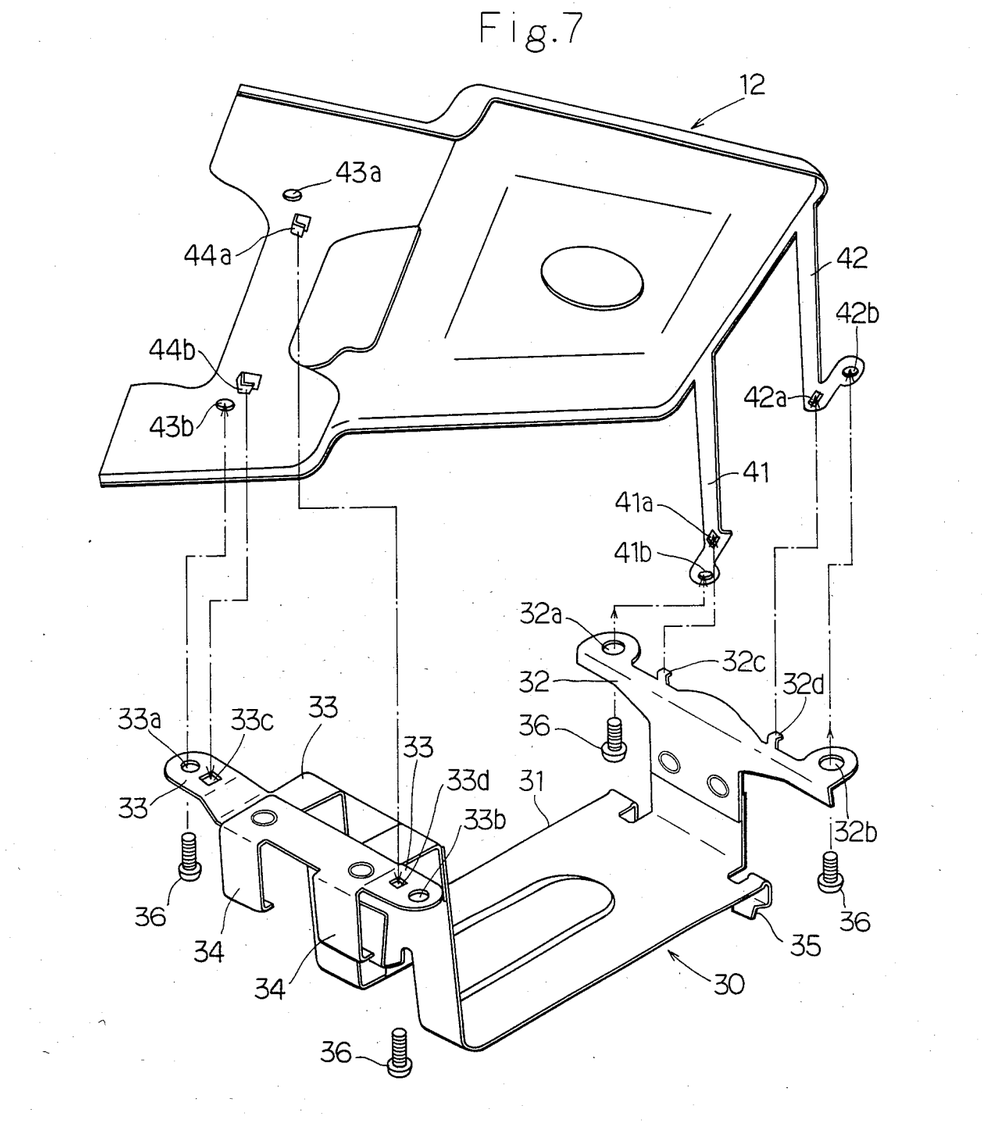
FIG. 7 is an exploded view of an upper bracket and the lower bracket.

The upper bracket 12 has a pair of mounting legs 41 and 42 depending from its front end. Each of the legs 41 and 42 has a horizontal lower end portion provided with a hole 41a or 42a for provisional securing and a screw hole 41b or 42b for permanent securing. The upper bracket 12 has a somewhat lower rear end portion provided with a pair of screw holes 43a and 43b for permanent securing and a pair of pawls 44a and 44b for provisional securing, as shown in FIG. 7. The contact plate 13 for a horn switch is movably disposed above the upper bracket 12. The impact energy absorber 15 is formed from brittle plastic, such as hard polyurethane foam or polystyrene, and so shaped as to be capable of absorbing a given impact load.

The front connector 32 on the lower bracket 30 is provided inwardly of the screw holes 32a and 32b with a pair of pawls 32c and 32d which are engageable with the holes 41a and 42a, respectively, of the upper bracket 12. The rear connector 33 is provided inwardly of the screw holes 33a and 33b with a pair of holes 33c and 33d with which the pawls 44b and 44a, respectively, of the upper bracket 12 are engageable.

The wheel pad 1 is assembled as will hereunder be described. The cover 11 is placed upside down and the upper bracket 12 is disposed therein. The absorber 15 is placed on the upper bracket 12 and the lower bracket 30 is placed over the absorber 15. The pawls 32c and 32d of the lower bracket 30 are engaged with the holes 41a and 42a, respectively, of the upper bracket 12 and the holes 33c and 33d of the rear connector 33 are engaged with the pawls 44b and 44a, respectively, of the upper bracket 12. Insofar as the main body 31 of the lower bracket 30 is formed from a sheet of spring steel, it supports the front and rear connectors 32 and 33 resiliently enough to facilitate the engagement of the pawls and the holes as hereinabove described. The resiliency of the lower bracket 30 ensures the engagement of the pawls and the holes against separation, as it urges the front and rear connectors 32 and 33 to move away from each other slightly. Then, four screws 36 are engaged threadedly with the nuts embedded in the inserts 14, but not shown, to join the upper and lower brackets 12 and 30 in which the absorber 15 is held. Insofar as the lower bracket 30 is provisionally joined to the upper bracket 12 as hereinabove described, the worker does not need to hold the lower bracket 30, but can tighten the screws 36 easily. It is possible to use an automatic screw tightening device, and no jig is required for holding the brackets. The screws are not the only means for joining the upper and lower brackets 12 and 30, but other methods, such as riveting or caulking, can be employed for that purpose.

Figure 8:
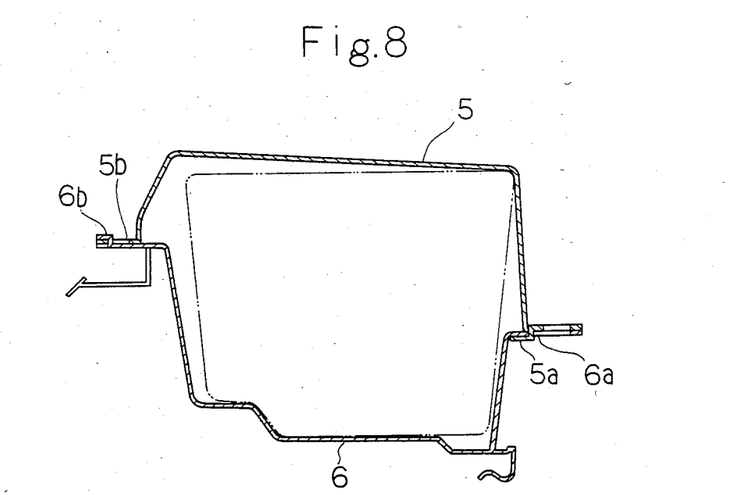
FIG. 8 is a sectional view of different brackets.

FIG. 8 shows an upper bracket 5 and a lower bracket 6 of the modified construction. The upper bracket 5 has a pawl 5a at its front end (on the righthand side of FIG. 8) and the lower bracket 6 has at its front end a hole 6a in which the pawl 5a is engaged. The upper bracket 5 has a hole 5b at its rear end (on the lefthand side of FIG. 8) and the lower bracket 6 has at its rear end a pawl 6b engaged in the hole 5b. The engagement of the pawls and the holes joins the upper and lower brackets 5 and 6 provisionally.

Referring now to FIGS. 9 to 12, a steering wheel according to a second embodiment of this invention includes a wheel pad 51 having a soft foamed plastic cover 56 at its top and a boss assembly 52. A plurality of hard plastic inserts 57 are provided in the cover 56 for maintaining it in proper shape. The cover 56 encloses an upper bracket 58 and a lower bracket 53 which are both formed from sheet metal and secured to the cover 56 by screws, and between which an impact energy absorber 59 is disposed. The absorber 59 is formed from brittle plastic, such as hard polyurethane foam.

Figure 12:
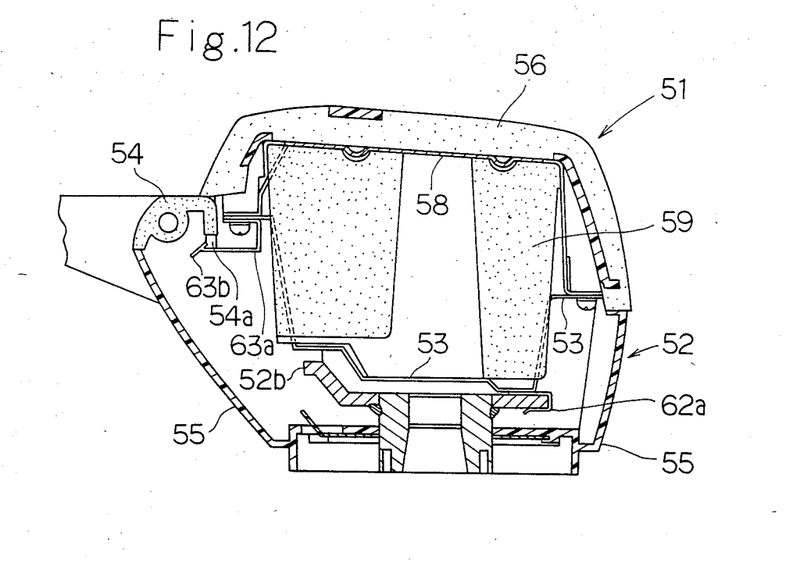
FIG. 12 is a sectional view of the wheel pad and the boss assembly as put together.
Figure 13:
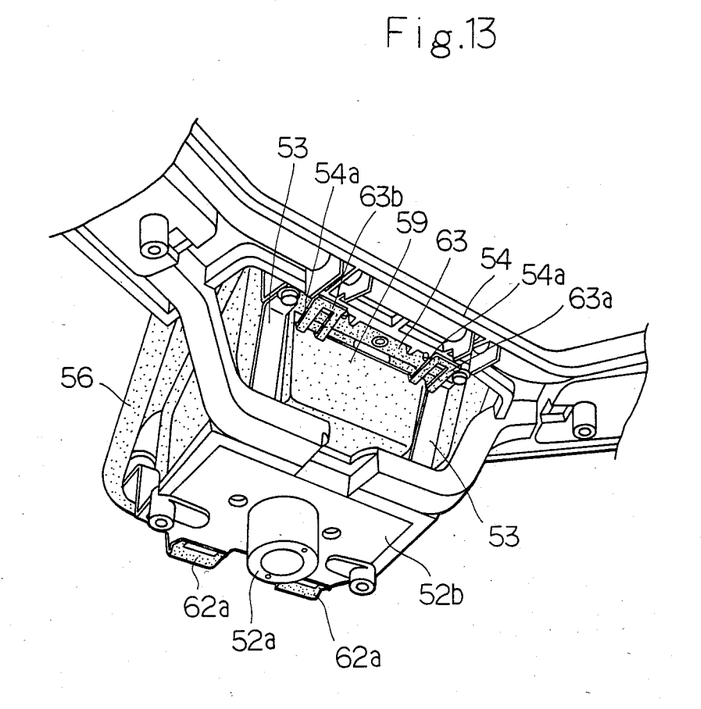
FIG. 13 is a bottom perspective view of the boss assembly from which a lower cover has been removed.

The lower bracket 53 comprises a main body 61 which is upwardly bent at each of its front and rear ends. Each of the front and rear ends of the main body 61 has a pair of transversely spaced apart screw holes. A front connector 62 is secured to the main body 61 below its front end and a rear connector 63 is secured to the rear end of the main body 61. The front connector 62 is formed from a sheet of spring steel and has a pair of connecting legs 62a which are engageable with the front edge of a boss plate as will hereinafter be described in further detail. The rear connector 63 is also formed from a sheet of spring steel and has a pair of rearwardly bent connecting legs 63a which are engageable with the wall of the main body of the steering wheel as will hereinafter be described in further detail. Each leg 63a terminates in a pawl 63b. Four screws extending through the respective screw holes of the brackets are threadedly engaged with the nuts embedded in the inserts 57, though not shown, whereby the upper and lower brackets 58 and 53 holding the absorber 59 therebetween are secured in the wheel pad 51, as shown in FIG. 12.

The boss assembly 52 comprises a boss plate 52b, a boss 52a secured in the center thereof, a pair of spoke cores secured to the opposite side edges of the boss plate 52b, the main body 54 of the steering wheel and a lower cover 55. The main body 54 is formed from a hard synthetic resin integrally with a ring, spokes and the rear end of the boss assembly 52. The lower cover 55 is formed from a hard synthetic resin and screwed down to enclose the bottoms of the boss assembly 52 and the spokes. The main body 54 is provided adjacent to the rear end of the boss assembly 52 with a pair of depending walls 54a with which the pawls 63b, respectively, of the rear connector 63 are engageable.

Figure 9:
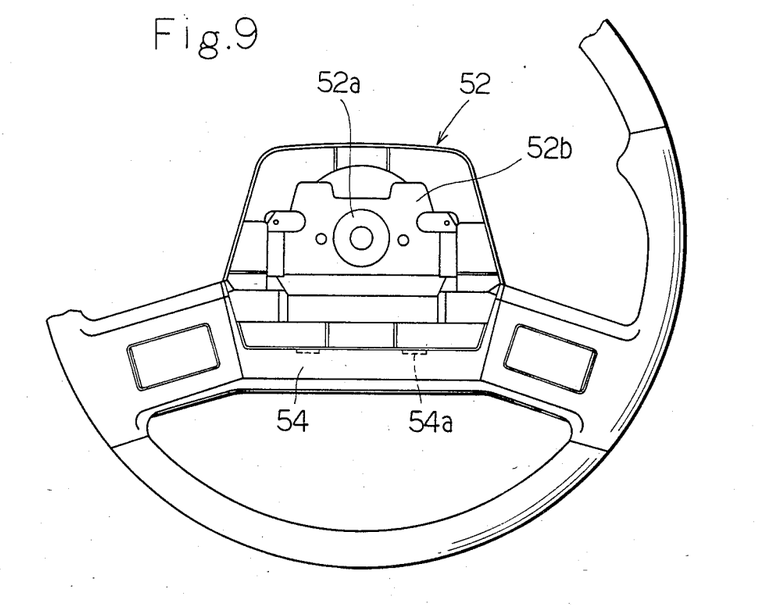
FIG. 9 is a fragmentary top plan view of a steering wheel according to a second embodiment of this invention.
Figure 10:
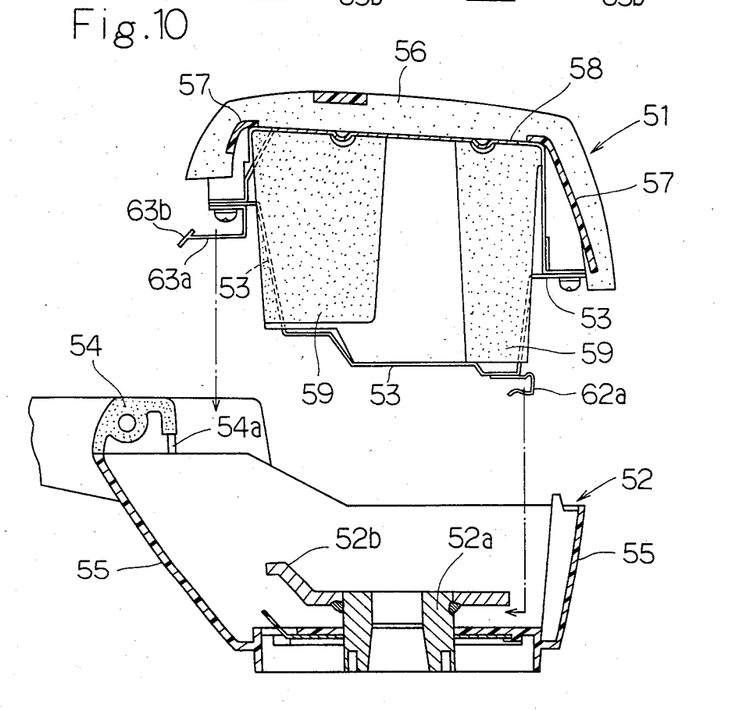
FIG. 10 is an exploded sectional view of the wheel pad and the boss assembly of the steering wheel shown in FIG. 9.
Figure 11:
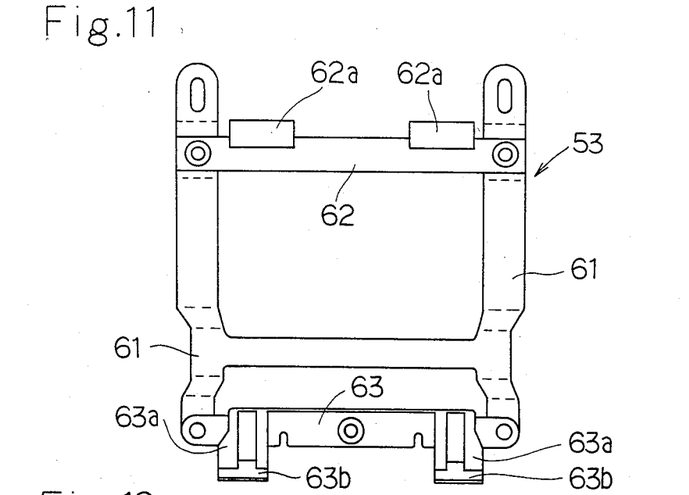
FIG. 11 is a bottom plan view of a lower bracket in the steering wheel according to the second embodiment of this invention.

The steering wheel of FIG. 9 is assembled as will hereunder be described. The boss assembly 52 is first joined to the top of a steering shaft by a tightened nut, and the wheel pad 51 is connected to the boss assembly 52, as will hereunder be described. The wheel pad 51 is brought to a position exactly above the boss assembly 52 as shown in FIG. 10. The wheel pad 51 is lowered into the boss assembly 52 in such a way that the front connector 62 on the lower bracket 53 may be disposed between the lower cover 55 and the front edge of the boss plate 52b. The wheel pad 51 is slid rearwardly, or to the left in FIG. 10, whereby the front connector 62 is resiliently engaged with the front edge of the boss plate 52b and the pawls 63b of the rear connector 63 are forced over the lower ends of the walls 54a, respectively, in the main body 54 into resilient engagement with the rear faces thereof. The walls 54a are, thus, held between the rear end of the cover 56 and the legs 63a of the rear connector 63, whereby the wheel pad 51 is secured to the boss assembly 52, as shown in FIG. 12. These features facilitate and ensure the connection of the wheel pad to the boss assembly without developing any clearance between the main body 54 and the cover 56. These features also have the advantage that the rear connector is engaged with not the lower cover, but with the main body of the steering wheel which is higher in rigidity.

Figure 17:
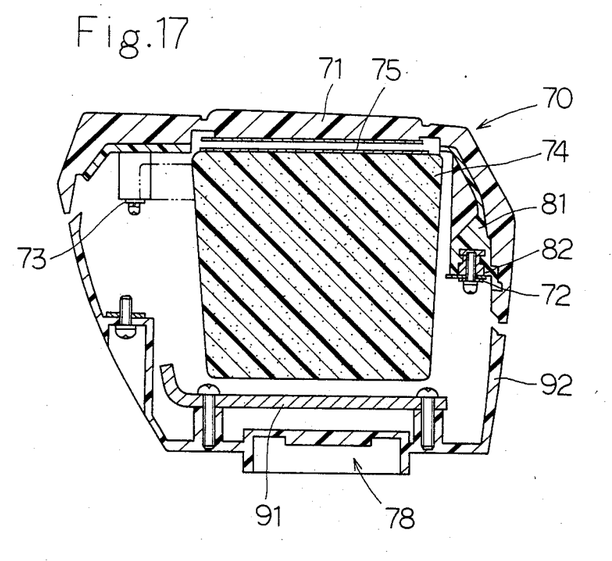
FIG. 17 is an enlarged sectional view taken along the line III—III of FIG. 14.

Referring now to FIGS. 14 to 18 showing a third embodiment of this invention, the steering wheel comprises a wheel pad 70 including a cover 71 which encloses a front bracket 72 and a rear bracket 73 which are both formed from sheet metal and screwed to the front and rear ends, respectively, of the cover 71 each at two transversely spaced apart points, an impact energy absorber 74 held between the brackets 72 and 73, and a horn switch assembly 75. The absorber 74 is formed from brittle plastic, such as hard polyurethane foam or polystyrene. The cover 71 is formed from soft plastic, such as soft polyurethane, polyvinyl chloride or the foamed product thereof. A plurality of hard plastic inserts 81 are usually provided in the cover 71 for maintaining it in proper shape. Metal nuts 82 are embedded in the inserts 81 for receiving the screws by which the brackets 72 and 73 are joined to the cover 71 (FIG. 17).

Figure 14:
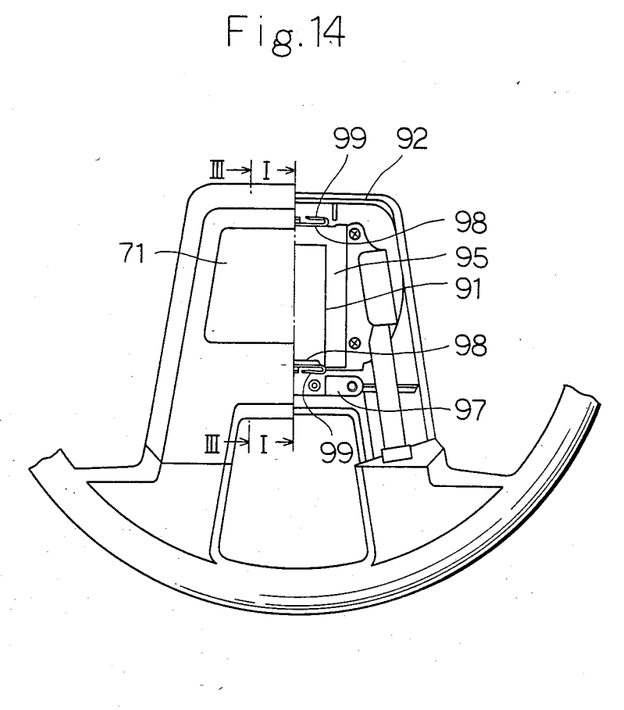
FIG. 14 is a fragmentary front elevational view, partly omitted, of a steering wheel according to a third embodiment of this invention.
Figure 15:
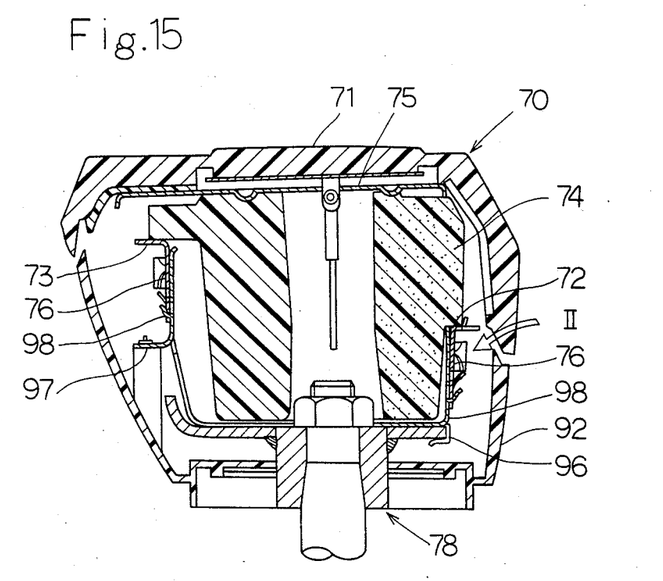
FIG. 15 is an enlarged sectional view taken along the line I—I of FIG. 14.
Figure 16:
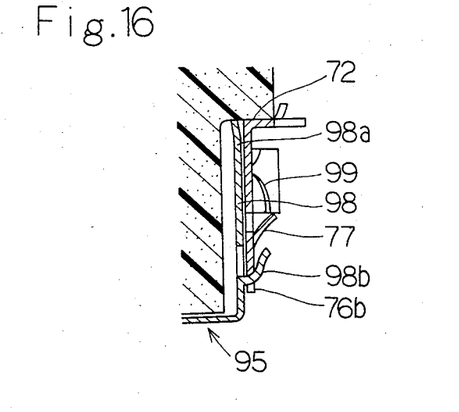
FIG. 16 is an enlarged view of portion II of FIG. 15.

The steering wheel also includes a boss plate 91 to which a lower cover 92 is secured by four screws. A support 95 is provided at its front end with a pair of connecting legs or clips 96 which are engageable with the front edge of the boss plate 91. The support 95 is of the sheet metal construction and provided at its rear end with an integral horizontal member 97 having a pair of screw holes through which two screws extend to secure the member 97 to the sidewall of the lower cover 92 at the rear end thereof, whereby the support 95 is secured to a boss assembly 78.

The brackets 72 and 73 are joined to the support 95 by two pairs of snap engaging members. The first pair of snap engaging members are of the male type and engageable into the second pair of the female type. The first pair of snap engaging members are formed on the front and rear brackets 72 and 73, respectively, and the second pair at the fron and rear ends, respectively, of the support 95. The planes of their engagement lie substantially in planes perpendicular to the boss plate.

Figure 18:
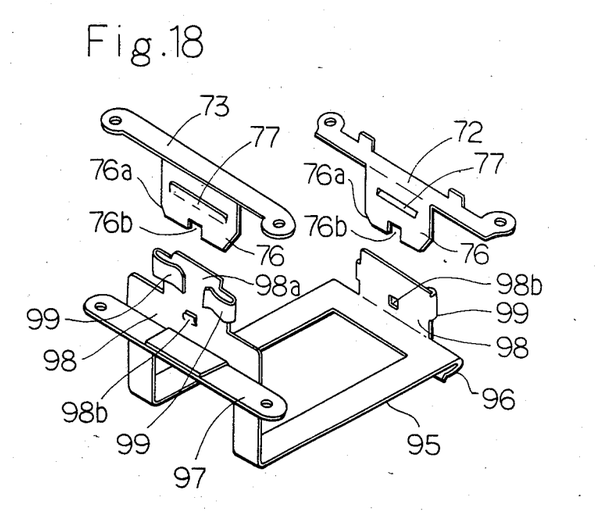
FIG. 18 is an exploded perspective view of a bracket.

The snap engaging members can be formed with a variety of shapes. Referring specifically to FIG. 18, however, each of the male members 76 comprises a rectangular wall depending from the bracket 72 or 73 and having a pair of beveled guide corners 76a and a central recess 76b at its lower end. The member 76 also includes a horizontally extending projection 77 having a shoulder along its upper edge. Reinforcing ribs may be formed on the opposite sides of the member 76. Each of the female members 98 comprises a wall upstanding from the front or rear end of the support 95 and having an outwardly facing guide surface 98a curved slightly inwardly or toward the boss at its upper end, a projection 98b formed below the guide surface 98a engageably with the recess 76b of the male member 76 and a pair of snap legs 99 formed between the guide surface 98a and the projection 98b by a pair of outwardly bent U-shaped extensions projecting from the opposite vertical edges, respectively, of the wall.

The wheel pad 70 is joined to the boss assembly 78 as will hereunder be described. The male members 76 on the front and rear brackets 72 and 73 are inserted into the female members 98, respectively, at the front and rear ends of the support 95. The resiliency of the snap legs 99 or the projection 77 or both permits the projection 77 to force itself past the legs 99 into snap engagement therewith. The projection 98b on the female member 98 fits the recess 76b of the male member 76 to prevent any further downward movement of the male member 76 and its transverse displacement.

The third embodiment of this invention is characterized in that the male and female snap engaging members are provided in the wheel pad and the boss assembly, respectively, and mutually engageable in the planes which are substantially perpendicular to the plane of the boss plate. It is, therefore, possible to join the support including the female members to the boss assembly before securing the boss assembly to the steering shaft and thereby avoid the difficulty which would be encountered by the tightening of the screws on the rear side of the lower cover if the boss assembly had to be first secured to the steering shaft, while the impact energy absorber can be positioned substantially coaxially with the boss assembly. The wheel pad is easy to join to the boss assembly, irrespective of the sidewall height of the lower cover, and can, therefore, be formed with a wide variety of decorative features.

What is claimed is:

1. A steering wheel comprising:
   (a) a boss assembly including a boss plate;
   (b) a wheel pad disposed on said boss assembly;
   (c) a brittle plastic impact energy absorber in said wheel pad;
   (d) bracket means provided in said wheel pad for holding said absorber therein and having a front connector and a rear connector; and
   (e) a support secured in said boss assembly adjacent to the rear end thereof, said front connector being engaged with the front edge of said boss plate, while said rear connector is engaged with said support, whereby said wheel pad is secured to said boss assembly.

2. A steering wheel as set forth in claim 1, wherein said bracket means comprises an upper bracket and a lower bracket joined to each other and provided at their joints with mutually engageable pawl and hole combinations by which said upper and lower brackets are provisionally secured to each other.

3. A steering wheel comprising:
   (a) a main body;
   (b) a boss assembly including a boss plate;
   (c) a wheel pad disposed on said boss assembly;
   (d) a brittle plastic impact energy absorber in said wheel pad; and
   (e) bracket means provided in said wheel pad for holding said absorber therein and having a front connector and a rear connector, said front connector being engaged with the front edge of said boss plate, while said rear connector is engaged with said main body, whereby said wheel pad is secured to said boss assembly.

4. A steering wheel comprising:
   (a) a boss assembly;
   (b) a wheel pad disposed on said boss assembly;
   (c) a brittle plastic impact energy absorber in said wheel pad;
   (d) bracket means provided in said wheel pad for holding said absorber therein and having a plurality of male engaging members and projections; and
   (e) a support secured to said boss assembly and having a plurality of female members into which said male members are engaged, whereby said wheel pad is secured to said boss assembly.

5. A steering wheel as set forth in claim 4, wherein said male members and said projections are formed on said support, while said female members are provided on said bracket means.

* * * * *